(12) United States Patent
Ramirez-Corredores et al.

(10) Patent No.: US 9,382,489 B2
(45) Date of Patent: *Jul. 5, 2016

(54) RENEWABLE HEATING FUEL OIL

(71) Applicant: Inaeris Technologies, LLC, Pasadena, TX (US)

(72) Inventors: Maria Magdalena Ramirez-Corredores, Houston, TX (US); Vicente Sanchez, Houston, TX (US); Changan Zhang, Houston, TX (US)

(73) Assignee: Inaeris Technologies, LLC, Pasadena, TX (US)

( * ) Notice: Subject to any disclaimer, the term of this patent is extended or adjusted under 35 U.S.C. 154(b) by 124 days.

This patent is subject to a terminal disclaimer.

(21) Appl. No.: 14/153,927

(22) Filed: Jan. 13, 2014

(65) Prior Publication Data

US 2014/0123545 A1    May 8, 2014

Related U.S. Application Data

(63) Continuation-in-part of application No. 13/025,483, filed on Feb. 11, 2011, now Pat. No. 8,628,589, and a continuation-in-part of application No. 13/964,873, filed on Aug. 12, 2013, which is a continuation-in-part of application No. 13/533,432, filed on Jun. 26, 2012, now Pat. No. 8,506,658, which is a continuation of application No. 12/915,872, filed on Oct. 29, 2010, now Pat. No. 8,377,152.

(51) Int. Cl.
| | |
|---|---|
| *C10G 1/00* | (2006.01) |
| *C10L 1/02* | (2006.01) |
| *C10G 1/02* | (2006.01) |
| *C10G 3/00* | (2006.01) |

(52) U.S. Cl.
CPC ... *C10L 1/02* (2013.01); *C10G 1/02* (2013.01); *C10G 3/44* (2013.01); *C10G 3/49* (2013.01); *C10G 2300/1011* (2013.01);
(Continued)

(58) Field of Classification Search
CPC .................................. C10G 1/00; C10G 3/00
USPC ............ 585/240, 242, 1; 44/300, 307; 208/14
See application file for complete search history.

(56) References Cited

U.S. PATENT DOCUMENTS

| | | | |
|---|---|---|---|
| 4,147,593 A | 4/1979 | Frischmuth et al. | |
| 4,209,647 A | 6/1980 | Gallivan et al. | |
| 4,222,845 A | 9/1980 | Schmid | |

(Continued)

FOREIGN PATENT DOCUMENTS

| | | |
|---|---|---|
| CN | 101144025 A | 3/2008 |
| CN | 101824330 | 9/2010 |

(Continued)

OTHER PUBLICATIONS

International Search Report dated Feb. 24, 2012 from corresponding PCT Patent Application No. PCT/US2011/055355, filed on Oct. 7, 2011; 16 pages.

(Continued)

*Primary Examiner* — Ellen McAvoy
(74) *Attorney, Agent, or Firm* — Dunlap Codding, P.C.

(57) ABSTRACT

More stable and valuable bio-oil produced from biomasses are provided. More specifically, more stable and valuable bio-oil useful as heating oil, alone or in combination with an oxygenated acyclic component, is provided. Particularly, various embodiments of the present invention provide for a bio-oil having sufficient heating value and stability to be useful as heating oil, alone or in combination with an oxygenated acyclic component, without the need to hydrotreat the bio-oil or use a similar deoxygenating process.

24 Claims, 3 Drawing Sheets

(56) References Cited

U.S. PATENT DOCUMENTS

| | | | |
|---|---|---|---|
| 4,299,690 A | 11/1981 | Allan | |
| 4,304,649 A | 12/1981 | Han et al. | |
| 4,396,487 A | 8/1983 | Strumskis | |
| 4,405,448 A | 9/1983 | Googin et al. | |
| 4,512,239 A | 4/1985 | Watanabe et al. | |
| 4,551,239 A | 11/1985 | Merchant et al. | |
| 4,645,585 A | 2/1987 | White | |
| 4,723,963 A | 2/1988 | Taylor | |
| 4,795,841 A | 1/1989 | Elliott et al. | |
| 4,942,269 A | 7/1990 | Chum et al. | |
| 4,960,507 A | 10/1990 | Evans et al. | |
| 5,104,545 A | 4/1992 | Means et al. | |
| 5,223,601 A | 6/1993 | Chum et al. | |
| 5,395,455 A | 3/1995 | Scott et al. | |
| 5,792,340 A | 8/1998 | Freel et al. | |
| 5,820,640 A | 10/1998 | Ikura et al. | |
| 5,877,380 A | 3/1999 | Conroy et al. | |
| 5,882,506 A | 3/1999 | Ohsol et al. | |
| 5,922,206 A | 7/1999 | Darlington, Jr. et al. | |
| 6,007,702 A | 12/1999 | Schievelbein | |
| 6,172,272 B1 | 1/2001 | Shabtai et al. | |
| 6,602,404 B2 | 8/2003 | Walsh et al. | |
| 6,814,940 B1 | 11/2004 | Hiltunen et al. | |
| 6,830,597 B1 | 12/2004 | Green | |
| 7,004,999 B2 | 2/2006 | Johnson et al. | |
| 7,262,331 B2 | 8/2007 | Van de Beld et al. | |
| 7,279,018 B2 | 10/2007 | Jakkula et al. | |
| 7,300,568 B2 | 11/2007 | Ketley et al. | |
| 7,311,739 B2 | 12/2007 | Bongart et al. | |
| 7,319,168 B2 | 1/2008 | Sanada | |
| 7,425,657 B1 | 9/2008 | Elliott et al. | |
| 7,501,054 B2 | 3/2009 | Galiasso | |
| 7,501,374 B2 | 3/2009 | Galiasso | |
| 7,578,927 B2 | 8/2009 | Marker et al. | |
| 7,638,314 B2 | 12/2009 | Zappi et al. | |
| 7,781,191 B2 | 8/2010 | Dunson, Jr. et al. | |
| 7,816,570 B2 | 10/2010 | Roberts, IV et al. | |
| 7,819,930 B2 | 10/2010 | Adams et al. | |
| 7,861,696 B2 | 1/2011 | Lund | |
| 7,883,882 B2 | 2/2011 | Franklin et al. | |
| 7,888,540 B2 | 2/2011 | Deluga et al. | |
| 7,892,300 B2 | 2/2011 | Galiasso | |
| 8,075,642 B2 | 12/2011 | Dumesic et al. | |
| 8,083,900 B2 | 12/2011 | Lin | |
| 8,097,172 B2 | 1/2012 | Islam et al. | |
| 8,101,808 B2 | 1/2012 | Evanko et al. | |
| 8,158,842 B2 | 4/2012 | McCall | |
| 8,202,332 B2 * | 6/2012 | Agblevor | 48/197 R |
| 8,236,173 B2 * | 8/2012 | Bartek et al. | 208/400 |
| 8,236,977 B2 | 8/2012 | Woods et al. | |
| 8,329,967 B2 | 12/2012 | Brandvold et al. | |
| 8,329,969 B2 * | 12/2012 | McCall et al. | 585/240 |
| 8,377,152 B2 | 2/2013 | Ramirez-Corredores et al. | |
| 8,454,712 B2 | 6/2013 | Ramirez-Corredores et al. | |
| 8,506,658 B2 | 8/2013 | Corredores et al. | |
| 8,519,203 B2 * | 8/2013 | Marinangeli et al. | 585/240 |
| 8,545,581 B2 * | 10/2013 | Agblevor | 48/197 R |
| 8,598,378 B2 * | 12/2013 | Cooney et al. | 554/174 |
| 8,628,589 B2 * | 1/2014 | Ramirez Corredores et al. | 44/307 |
| 8,669,405 B2 * | 3/2014 | Ramirez Corredores et al. | 585/240 |
| 8,853,484 B2 * | 10/2014 | Ramirez Corredores et al. | 585/733 |
| 8,979,955 B2 * | 3/2015 | Agblevor et al. | 48/197 R |
| 2003/0115792 A1 | 6/2003 | Shabtai et al. | |
| 2003/0207407 A1 | 11/2003 | Buchanan et al. | |
| 2004/0055209 A1 | 3/2004 | Jakkula et al. | |
| 2004/0111955 A1 | 6/2004 | Mullay et al. | |
| 2006/0041152 A1 | 2/2006 | Cantrell et al. | |
| 2006/0070912 A1 | 4/2006 | Khan | |
| 2006/0161032 A1 | 7/2006 | Murzin et al. | |
| 2007/0007188 A1 | 1/2007 | Skrypski-Mantele et al. | |
| 2007/0161095 A1 | 7/2007 | Gurin | |
| 2007/0260102 A1 | 11/2007 | Duarte Santiago et al. | |
| 2007/0261296 A1 | 11/2007 | Adams et al. | |
| 2008/0006520 A1 | 1/2008 | Badger et al. | |
| 2008/0050795 A1 | 2/2008 | Mansson et al. | |
| 2008/0172931 A1 | 7/2008 | Bazzani et al. | |
| 2008/0217211 A1 | 9/2008 | Chornet et al. | |
| 2008/0264771 A1 | 10/2008 | Dam-Johansen et al. | |
| 2008/0300434 A1 | 12/2008 | Cortright et al. | |
| 2008/0312476 A1 | 12/2008 | McCall | |
| 2009/0000185 A1 | 1/2009 | Aulich et al. | |
| 2009/0007484 A1 | 1/2009 | Smith | |
| 2009/0054711 A1 | 2/2009 | Lawrence et al. | |
| 2009/0065378 A1 | 3/2009 | Maas | |
| 2009/0119979 A1 | 5/2009 | Mullen | |
| 2009/0124839 A1 | 5/2009 | Dumesic et al. | |
| 2009/0139851 A1 | 6/2009 | Freel | |
| 2009/0151233 A1 | 6/2009 | Miller | |
| 2009/0165378 A1 | 7/2009 | Agblevor | |
| 2009/0166256 A1 | 7/2009 | Lewis et al. | |
| 2009/0182064 A1 | 7/2009 | Griffin | |
| 2009/0182166 A1 | 7/2009 | Kubatova et al. | |
| 2009/0182199 A1 | 7/2009 | Rudischhauser et al. | |
| 2009/0227823 A1 | 9/2009 | Huber et al. | |
| 2009/0229173 A1 | 9/2009 | Gosling | |
| 2009/0234030 A1 | 9/2009 | Gouman | |
| 2009/0234146 A1 | 9/2009 | Cooney et al. | |
| 2009/0250376 A1 | 10/2009 | Brandvold et al. | |
| 2009/0253947 A1 | 10/2009 | Brandvold et al. | |
| 2009/0253948 A1 | 10/2009 | McCall et al. | |
| 2009/0259082 A1 | 10/2009 | Deluga et al. | |
| 2009/0294324 A1 | 12/2009 | Brandvold et al. | |
| 2009/0301930 A1 | 12/2009 | Brandvold et al. | |
| 2009/0318737 A1 | 12/2009 | Luebke | |
| 2010/0002792 A1 | 1/2010 | Seyedi-Esfahani | |
| 2010/0064574 A1 | 3/2010 | de Almeida et al. | |
| 2010/0076238 A1 | 3/2010 | Brandvold et al. | |
| 2010/0083566 A1 | 4/2010 | Fredriksen et al. | |
| 2010/0105970 A1 | 4/2010 | Yanik et al. | |
| 2010/0162625 A1 | 7/2010 | Mills | |
| 2010/0212215 A1 | 8/2010 | Agblevor | |
| 2010/0218417 A1 | 9/2010 | Bauldreay et al. | |
| 2010/0256428 A1 | 10/2010 | Marker et al. | |
| 2011/0003218 A1 | 1/2011 | Stolte et al. | |
| 2011/0068049 A1 | 3/2011 | Garcia, III et al. | |
| 2011/0083998 A1 | 4/2011 | Hamper et al. | |
| 2011/0126449 A1 | 6/2011 | Xu et al. | |
| 2011/0138681 A1 | 6/2011 | Ramirez-Corredores et al. | |
| 2011/0139262 A1 | 6/2011 | Aburto Anell et al. | |
| 2011/0139602 A1 | 6/2011 | Lin et al. | |
| 2011/0146140 A1 | 6/2011 | Brandvold et al. | |
| 2011/0155631 A1 | 6/2011 | Knuuttila et al. | |
| 2011/0192072 A1 | 8/2011 | Steele et al. | |
| 2011/0245489 A1 | 10/2011 | Steele et al. | |
| 2011/0259793 A1 | 10/2011 | Umansky et al. | |
| 2011/0282118 A1 | 11/2011 | Shih | |
| 2012/0000821 A1 | 1/2012 | Yang et al. | |
| 2012/0005949 A1 | 1/2012 | Stevens et al. | |
| 2012/0101317 A1 | 4/2012 | Knight et al. | |
| 2012/0101318 A1 | 4/2012 | Ramirez-Corredores et al. | |
| 2012/0144730 A1 * | 6/2012 | Stamires et al. | 44/307 |
| 2012/0151827 A1 | 6/2012 | Powell et al. | |
| 2012/0172643 A1 | 7/2012 | Ramirez-Corredores et al. | |
| 2012/0190872 A1 | 7/2012 | Cranford et al. | |
| 2012/0204479 A1 | 8/2012 | Ramirez Corredores et al. | |
| 2012/0204481 A1 | 8/2012 | Corredores et al. | |
| 2012/0216448 A1 | 8/2012 | Ramirez-Corredores et al. | |
| 2012/0289440 A1 | 11/2012 | Pollard et al. | |
| 2013/0004646 A1 | 1/2013 | Franklin et al. | |
| 2013/0014431 A1 * | 1/2013 | Jin et al. | 44/307 |
| 2013/0023706 A1 | 1/2013 | Huber et al. | |
| 2013/0035502 A1 | 2/2013 | Cohen et al. | |
| 2013/0043192 A1 | 2/2013 | Smith et al. | |
| 2013/0090502 A1 | 4/2013 | Laakkonen et al. | |
| 2013/0140216 A1 | 6/2013 | Wickes et al. | |
| 2013/0144089 A1 | 6/2013 | Fjare et al. | |
| 2013/0174476 A1 | 7/2013 | Ramirez-Corredores et al. | |
| 2013/0326936 A1 * | 12/2013 | Ramirez-Corredores et al. | 44/388 |
| 2014/0256965 A1 * | 9/2014 | Asikkala et al. | 549/502 |

(56) References Cited

U.S. PATENT DOCUMENTS

| | | | |
|---|---|---|---|
| 2014/0261715 A1 | | 9/2014 | Abhari et al. |
| 2014/0288338 A1* | | 9/2014 | Radlein et al. ............... 585/251 |
| 2015/0184098 A1* | | 7/2015 | Talwar |

FOREIGN PATENT DOCUMENTS

| | | |
|---|---|---|
| CN | 101875846 | 11/2010 |
| EP | 293069 | 6/1991 |
| EP | 0513051 | 12/1994 |
| EP | 0718392 | 9/1999 |
| EP | 1452579 | 9/2004 |
| EP | 1719811 | 11/2006 |
| EP | 2105456 | 9/2009 |
| EP | 2107100 | 10/2009 |
| EP | 2236584 | 10/2010 |
| EP | 2325281 | 5/2011 |
| GB | 2399571 | 9/2004 |
| KR | 10/0857247 | 9/2008 |
| WO | WO/00/71494 A1 | 11/2000 |
| WO | WO/01/07537 | 2/2001 |
| WO | 2006037368 | 4/2006 |
| WO | 2007128798 | 11/2007 |
| WO | 2007128800 | 11/2007 |
| WO | 2008020167 | 2/2008 |
| WO | 2009014859 | 1/2009 |
| WO | WO 2009/071495 | 6/2009 |
| WO | 2009082366 | 7/2009 |
| WO | WO 2009/111026 | 9/2009 |
| WO | WO/2009/115888 A1 | 9/2009 |
| WO | 2009126508 | 10/2009 |
| WO | WO/2009/130392 A1 | 10/2009 |
| WO | 2010002792 | 1/2010 |
| WO | 2010002886 | 1/2010 |
| WO | 2010008686 | 1/2010 |
| WO | 2010033512 | 3/2010 |
| WO | 2010033789 | 3/2010 |
| WO | WO/2010/033789 A2 | 3/2010 |
| WO | 2010068809 | 6/2010 |
| WO | WO 2010/088486 | 8/2010 |
| WO | WO 2010/124069 | 10/2010 |
| WO | 2010135734 | 11/2010 |
| WO | WO/2011/069510 A1 | 6/2011 |
| WO | WO/2011/096912 A1 | 8/2011 |
| WO | 2011143396 | 11/2011 |
| WO | WO/2012/035410 | 3/2012 |

OTHER PUBLICATIONS

Hilten, et al. "Comparisons of Three Accelerated Aging Procedures to Assess Bio-Oil Stability" Fuel 89(2010), 2741-2749.

Ikura, et al "Emulsification of Pyrolysis Derived Bio-Oil in Diesel Fuel"; Biomass & BioEnergy, (2003); vol. 24; pp. 221-232.

Chiaramonti, et al. "Development of Emulsions From Biomass Pyrolysis Liquid and Diesel and Their Use in Engines, Part 1: Emulsion Production"; Biomass & BioEnergy (2003); vol. 25; pp. 85-89.

Qi, et al. Review of Biomass Pyrolysis Oil Properties and Upgrading Research Energy Conversion & Management; (2007); vol. 48; pp. 87-92.

Garcia-Perez, et al. "Production and Fuel Properties of Fast Pyrolysis Oil/Bio-Diesel Blends" Fuel Processing Technology; (2010); vol. 91, pp. 296-305.

Ringer, et al. "Large-Scale Pyrolysis Oil Production: A Technology Assessment and Economic Analysis"; NREL Technical Report, NREL/TP-510-37779, Nov. 2006.

Czernik, et al. "Stability of Wood Fast Pyrolysis Oil"; Biomass and Bioenergy, vol. 7, Nos. 1-6, pp. 187-192; 1994 Great Britain.

Mahinpey, et al. "Analysis of Bio-Oil, Biogas, and Biochar From Pressurized Pyrolysis of Wheat Straw Using a Tubular Reactor"; Energy & Fuels (2009); vol. 23, pp. 2736-2742.

Czernik, et al. "Overview of Applications of Biomass Fast Pyrolysis Oil"; Energy & Fuels, (2004); vol. 18; pp. 590-598.

Oasmaa et al. "Fast Pyrolysis of Forestry Residue. 3. Storage Stability of Liquid Fuel"; Energy & Fuels (2003); vol. 17, pp. 1075-1084.

Diebold, "A Review of the Chemical and Physical Mechanisms of the Storage Stability of Fast Pyrolysis Bio-Oils"; NREL/SR-570-27613, Jan. 2000.

Moens, et al. "Study of the Neutralization and Stabilization of a Mixed Hardwood Bio-Oil"; Energy & Fuels (2009), vol. 23, pp. 2695-2699.

Search Report and Written Opinion for corresponding PCT Application No. PCT/US2012/022951; filed on Jan. 27, 2012; Applicant: KiOR, Inc.; 12 pages.

Bridgewater et al., "An Over of Fast Pyrolysos of Biomass, Organic Geochemistry 30" (1999); 15 Pages 1479-1493,;Bio-Energy Research Group, Chemical Engineering and Applied Chemistry Department, Aston University, Ontario, Canada.

Ozcimen et al., "Production and Characterization of Bio-Oil and Biochar From Rapeseed 16 Cake", Renewable Energy 29 (2004), pp. 779-787, Department of Chemical Engineering, Instanbul Technical University, Istanbul, Turkey.

A.V. Bridgewater, G.V.C. Peacocke, "Fast Pyrolysos Processes for Biomass, Renewable and Sustainable Energy Reviews", (2000); vol. 4, pp. 1-73.

Richard Bain "Biodiesel and Other Renewable Diesel Fuels", publication, National Renewable Energy Laboratory, Nov. 2006.

Mathrop, "An Introduction to Petroleum Refining and the Production of Ultra Low Sulfur Gasoline and Diesel Fuel", publication, Mathrop, Inc. 2011.

Roger Leisenring, "Standard Specification for Diesel Fuel Oils", publication, ASTM International, Pennsylvania, Jan. 2012.

"HM 40 Guidelines for the Crude Oil Washing of Ships' Tanks and the Heating of Crude Oil Being Transported by Sea", publication, Energy Institute, London, Jun. 2004.

Sanchez et al. , Properties of Gasoline and Biofuels Containing Renewable Drop-In Biofuel Blend Stocks Prepared by the Thermo-Catalytic Conversion of Lignocellulose, 2012 IASH Conference Presentation, KiOR, Inc. and Petro Tech Consultants LLC.

Sanchez, et al. , "Renewable Fuel Bi-products Potential Use in Asphalt", 2012 AAPT Annual Meeting Presentation, KiOR, Inc. Texas 2012.

U.S. Appl. No. 13/964,873, filed Aug. 12, 2013; inventor: Ramirez-Corredores et al.

Huber et al. , Production of Liquid Alkanes by Aqueous-Phase Processing of Biomass-Derived Carbohydrates; (2005); vol. 308, pp. 1146 to 1150.

Fukuda, Masanori et al. , "The Effect of Fuel Aromatic Structure and Content on Direct Injection Diesel Engine Particulates"; Society of Automotive Engineers; [Progress in Technology] PT; PT-1 11 (alternative Diesel Fuels); (2004) 259-270 Coden: SAEPDU; XP009175497.

Mrad, Nadia et al. "Effects of Biofuel From Fish Oil Industrial Residue—Diesel Blends in 27 Diesel Engine" vol. 44, No. 1: Aug. 1, 2012; pp. 955-963; XP55096129; ISSN: 0360-5442; DOI: 10-101 6/j.energy.201 2.04.056.

Han, Shen et al.; "Selecting Pour Depressants for Diesel Fuels"; Chemistry and Technology of Fuels and Oils; vol. 46., No. 5; Dec. 1, 2010 ; pp. 309-318.

Graboski, et al. NREL Report SR-510-31461 (2/03). "The Effect of Biodiesel Composition on Engine Emissions from 29 a DDC Series 60 Diesel Engine"; http://nanotechfuelcorporation.com/NOx/NREL_5.pdf.

Y.W. Deng, J. of Energy Oil and Gas Research, I, 7-11 (2012). A Study on Relationship Between the Compositions and Properties of Fuel and Emissions from Diesel Engine with Fuzzy-Gray Theory http://www.e3journals.org/cms/articles/I330899070_Deng.pdf.

Environmental Protection Agency, Technology Transfer Network Clearinghouse for Inventories and Emission Factors 31 (2012); http://www.epa.gov/ttn/chief/trends/index . html.

Preliminary Report on Patentability for co-pending PCT Patent Application No. PCT/US2011/055355, International Filing Date Oct. 7, 2011, 16 pages.

PCT/US2011/055411—WO/2012/057988—International Search Report—dated Mar. 12, 2012.

PCT/US2012/022945—WO/2012/109034—International Search Report—dated Sep. 25, 2012.

(56) References Cited

OTHER PUBLICATIONS

PCT/US2012/050561—WO/2013/025600—International Search Report and Written Opinion, dated Jan. 2, 2013, 13 pages.
PCT/US2012/050561—WO/2013/025600—International Preliminary Report on Patentability, dated Feb. 18, 2014, 9 pages.
PCT/US2014/035804—WO/2014/182499—International Search Report and Written Opinion, dated Aug. 19, 2014, 9 pages.
PCT/US2015/010056—WO2015105732—International Search Report and Written Opinion—dated Apr. 29, 2015.
CN101144025A, Office Action including Search Report, dated Feb. 28, 2015 (6 pages).
CN201280008458.0, Office Action dated Sep. 17, 2014 (8 pages).
CN201280008458.0, Office Action dated Apr. 29, 2015 (3 pages).
Adjaye et al., "Production of hydrocarbons by catalytic upgrading of a fast pyrolysis bio-oil. Part 1: Conversion over various catalysts", Fuel Processing Technology, vol. 45, pp. 161-183, 1995, 23 pages.
Adjaye et al., "Production of hydrocarbons by catalytic upgrading of a fast pyrolysis bio-oil. Part 2: Comparative catalytic performance and reaction pathways", Fuel Processing Technology, vol. 45, pp. 185-202, 1995, 18 pages.
Diebold et al., "Additives to Lower and Stabilize the Viscosity of Pyrolysis Oils during Storage", American Chemical Society Publications, National renewable Energy laboratory, Golden Colorado, Energy Fuels, 1997, vol. 11, Issue 5, pp. 1081-1091, 3 pages, Abstract Only.
Chevron Diesel Technical Fuel Review 2007.
Elliott et al., "Liquid Fuels by Low-Severity Hydrotreating of Biocrude", Developments in Thermochemical Biomass Conversion, vol. 1, pp. 611-621, A. V. Bridgwater and D. G. B. Boocock, eds., Blackie Academic & Professional, 1996, London, 11 pages.
Gerdes et al., "Alternatives from Wood and Cellulose, Precoat Filtration with Organic Filter Aids", J. Rettenmaier Benelux, Filtration & Separation, vol. 34, No. 10, ISSN 0015-1882, Dec. 1997, 6 pages.
Lehto et al.., "Fuel Oil Quality and Combustion of Fast Pyrolysis Bio-oils," Espoo 2013, VTT Technology 87, 84 pages.
Mohan et al., "Pyrolysis of Wood/Biomass for Bio-oil: A Critical Review", Energy & Fuels, 20, 2006, 848-889.
Pollard, "Comparison of Bio-Oil Produced in a Fractionated Bio-Oil Collection System", Graduate College, Iowa State University, 2009, 173 pages.
Sinnott, Chemical Engineering Design, vol. 6, $4^{th}$ Edition, Butterworth-Heinemann—an imprint of Elsevier, 2005, 1038 pages.
Song et al., "Effective Phase Separation of Biomass Pyrolysis Oils by Adding Aqueous Salt Solutions", Energy & Fuels, vol. 23, 2009, pp. 3307-3312.
U.S. Department of Energy, "Technical Information Exchange on Pyrolysis Oil: Potential for Renewable Heating Oil Substitution Fuel in New England," Workship Report: Pyrolysis Oil Technical Information Exchange Workship Summary Report, May 9-10, 2012, Manchester, New Hapshire, Engergestics Incorporated, Columbia, Maryland, Bioenergy Technologies Office, Washington, DC.
World Minerals, "Maximize Biodiesel Yields by Using Celite® Filter Aids, Filtration, Dewatering, Dewaxing and Winterization", Biodiesel, World Minerals Americas and World Headquarters, World Minerals Inc., Santa Barbara, California, USA, 2009, 4 pages.
PCT/US2014/048648—International Search Report and Written Opinion—mailed Dec. 3, 2014.
PCT/US2015/011160—International Search Report and Written Opinion—mailed Apr. 14, 2015.
European Application No. 12824005.8—European Search Report—mailed Nov. 19, 2015.
European Application No. 11836833.1—European Search Report—mailed Jul. 16, 2014.
Beis et al., "Fixed-bed pyrolysis of safflower seed: influence of pyrolysis parameters on product yields and compositions", Renewable Energy, Issue 26, 2002, pp. 21-32.
Li et al., "Analysis of upgrading of bio-petroleum from biomass by direct deoxy-liquefaction", Journal of Analytical and Applied Pyrolysis, Issue 81, 2008, pp. 199-204.
Ozbay et al., "Comparative analysis of pyrolysis oils and its subfractions under different atmospheric conditions", Fuel Processing Technology, Issue 87 2006, pp. 1013-1019.
Wang et al., "Comparative studies of products produced from four different bimass samples via deoxy-liquefaction", Bioresource Technology, Issue 99, 2008, pp. 2778-2786.

* cited by examiner

RENEWABLE HEATING FUEL OIL

CROSS REFERENCE TO RELATED APPLICATIONS/INCORPORATION BY REFERENCE STATEMENT

This application is a Continuation-in-Part of, and claims the benefit of, co-pending U.S. application Ser. No. 13/025,483, filed Feb. 11, 2011, which is hereby incorporated by reference in its entirety herein; and this application is a Continuation-in-Part of, and claims the benefit of, co-pending U.S. application Ser. No. 13/964,873, filed Aug. 12, 2013, which is hereby incorporated by reference in its entirety herein and which is a Continuation-in-Part of U.S. application Ser. No. 13/533,432, filed Jun. 26, 2012, which is also hereby incorporated by reference in its entirety herein. U.S. application Ser. No. 13/533,432 is a continuation application of U.S. application Ser. No. 12/915,872 filed on Oct. 29, 2010, which is also hereby incorporated by reference in its entirety herein. All publications and patents mentioned herein are hereby incorporated by reference in their entirety as if each individual publication or patent was specifically and individually indicated to be incorporated by reference.

FIELD OF THE INVENTION

Embodiments of the present invention relate generally to more stable and valuable bio-oils made from biomasses, more specifically it relates to bio-oils that are useful as heating oil. Particularly, various embodiments of the present invention provide for a bio-oil useful as heating oil without the need to hydrotreat the bio-oil or use a similar deoxygenating process. Various embodiments also relate to renewable heating oils containing such bio-oil and an oxygenated acyclic component.

BACKGROUND OF THE INVENTION

With the rising costs and environmental concerns associated with fossil fuels, renewable energy sources have become increasingly important. The development of renewable fuel sources provides a means for reducing the dependence on fossil fuels. Accordingly, many different areas of renewable fuel research are currently being explored and developed.

With its low cost and wide availability, biomass has increasingly been emphasized as an ideal feedstock in renewable fuel research. Consequently, many different conversion processes have been developed that use biomass as a feedstock to produce useful biofuels and/or specialty chemicals. Existing biomass conversion processes include, for example, combustion, gasification, slow pyrolysis, fast pyrolysis, liquefaction, and enzymatic conversion. One of the useful products that may be derived from the aforementioned biomass conversion processes is a liquid product commonly referred to as "bio-oil." Bio-oil may be processed into transportation fuels, hydrocarbon chemicals, and/or specialty chemicals.

Despite recent advancements in biomass conversion processes, many of the existing biomass conversion processes produce low-quality bio-oils containing high amounts of oxygen, which are difficult, if not impossible, to separate into various fractions. These bio-oils require extensive secondary upgrading in order to be utilized as heating oils or heating fuels due to the high amounts of oxygen present in the bio-oil.

More specifically, the production of bio-oil by pyrolysis, both fast and slow, can be problematic. Pyrolysis is characterized by the thermal decomposition of materials in an oxygen-poor or oxygen-free atmosphere (i.e., significantly less oxygen than required for complete combustion). In the past, pyrolysis has referred to slow pyrolysis whose equilibrium products included non-reactive solids (char and ash), liquids (tar and/or pyroligneous liquor), and non-condensable gases.

More recently, it has been recognized that pyrolysis can be carried out through a fast (rapid or flash) pyrolysis method where finely divided feedstock is rapidly heated and the reaction time is kept short, i.e. on the order of seconds. Such fast pyrolysis results in high yields of primary, non-equilibrium liquids and gases (including valuable chemicals, chemical intermediates, hydrocarbon chemicals and bio-fuels).

The non-equilibrium liquids (pyrolysis oil or bio-oil) produced by fast pyrolysis are suitable as a fuel for clean, controlled combustion in boilers and for use in diesel and stationary turbines. In fact, such bio-oil liquids offer some distinctive advantages for heating and power production over biomass gasification products and direct combustion of the biomass. Some of the advantages of bio-oil are:

Higher energy densities compared to direct combustion of the raw biomass;

More easily/cost effective to transport and handle than raw biomass or producer gas;

Existing boilers may be used with bio-oil, subject only to retrofitting;

Fewer emissions in boiler use compared to solid fuels due to better control of the combustion process; and Bio-oil from pyrolysis processes is the least cost liquid bio-fuel for stationary use and its net $CO_2$-balance is better than that of other bio-fuels.

However, besides all those advantages, instability, corrosiveness, ash/solids content and low heating value compared to conventional heating oil, have precluded a full success of pyrolysis bio-oils as a heating fuel. Moreover, it has been recognized that pyrolysis derived bio-oils are unsuitable for use as a heating oils and cannot be directly used as a heating oil without subsequent hydrotreating (see for example EP 0718392 and WO 2009/126508). In fact EP 0718392 notes that hydrotreating to completely remove oxygen from bio-oil would represent a major and prohibitive cost because of the high oxygen content of pyrolysis derived bio-oil.

Accordingly, it would be advantageous to develop a pyrolysis derived bio-oil that could be used as a heating oil, alone or in combination with an oxygenated acyclic component, wherein such bio-oil, or heating oil containing such bio-oil and oxygenated acyclic component, had improved stability, less corrosiveness and higher heating value than prior art bio-oils without having to undergo hydrotreating or other deoxygenating processes.

SUMMARY

In one embodiment of the present invention, there is provided a renewable heating fuel oil composition derived from the thermochemical conversion of a cellulosic biomass wherein the renewable heating fuel oil composition comprises hydrocarbons consisting of (a) an oxygenated component present in an amount such that the renewable heating fuel oil composition has an oxygen content of less than about 30 weight percent, and (b) a non-oxygenated component having an aromatic content greater than about 40 weight percent.

In another embodiment of the present invention, there is provided a renewable heating fuel oil composition derived from a cellulosic biomass wherein the renewable heating fuel oil composition is produced by a process comprising: (a) converting at least a portion of the cellulosic biomass material in an oxygen-poor environment in the presence of a catalyst material at a temperature in the range of from about 200° C. to about 1000° C. to produce a reaction product stream containing the renewable heating fuel oil composition; and (b) separating the renewable heating fuel oil composition from the reaction product stream such that the heating oil composition has a heating value of at least about 10,000 btu/lb without an oxygen-removing hydrotreatment step, and wherein the renewable heating fuel oil composition comprises mainly hydrocarbons and the hydrocarbons consist of (i) an oxygenated component present in an amount such that the renewable heating fuel oil composition has an oxygen content of less than about 30 weight percent, and (ii) a non-oxygenated component having an aromatic content greater than about 40 weight percent.

In another embodiment of the present invention, there is provided a renewable fuel oil composition comprising: a) a first component comprising a bio-oil derived from the thermochemical conversion of biomass, wherein the bio-oil comprises: i) an oxygenated component having an oxygen content of at least about 5 wt %, and ii) a non-oxygenated component having an aromatic content of at least about 25 wt %; b) a second component comprising an oxygenated acyclic component comprising open chain molecules having 12 or more carbon atoms per molecule; and wherein the renewable fuel oil composition has a heating value of at least about 14,000 Btu/lb.

BRIEF DESCRIPTION OF THE DRAWING FIGURES

Embodiments of the present invention are described in detail below with reference to the attached figures, wherein.

Figure 3:
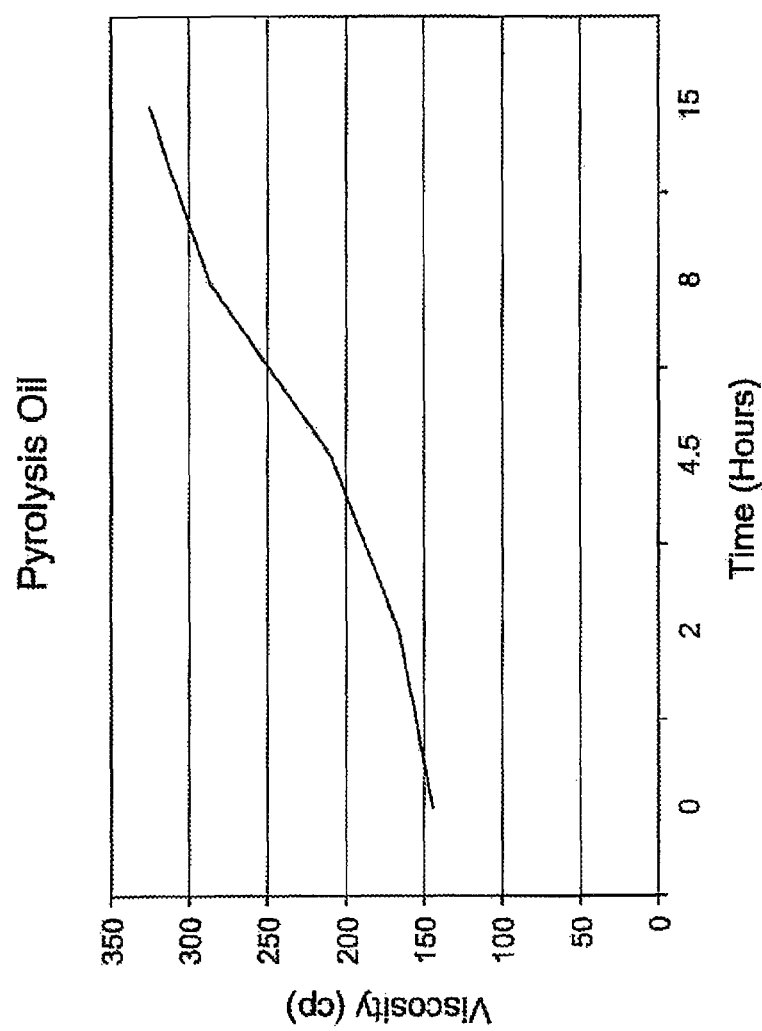

FIG. 3 is a graph illustrating data on the stability of pyrolysis oil at 90° C. taken from Table 2 of Czernik, S.; Johnson, D. K. and Black, S. Stability of wood fast pyrolysis oil. Biomass and Bioenergy 1994. 7 (1-6), 187-192.

DETAILED DESCRIPTION

Figure 1:
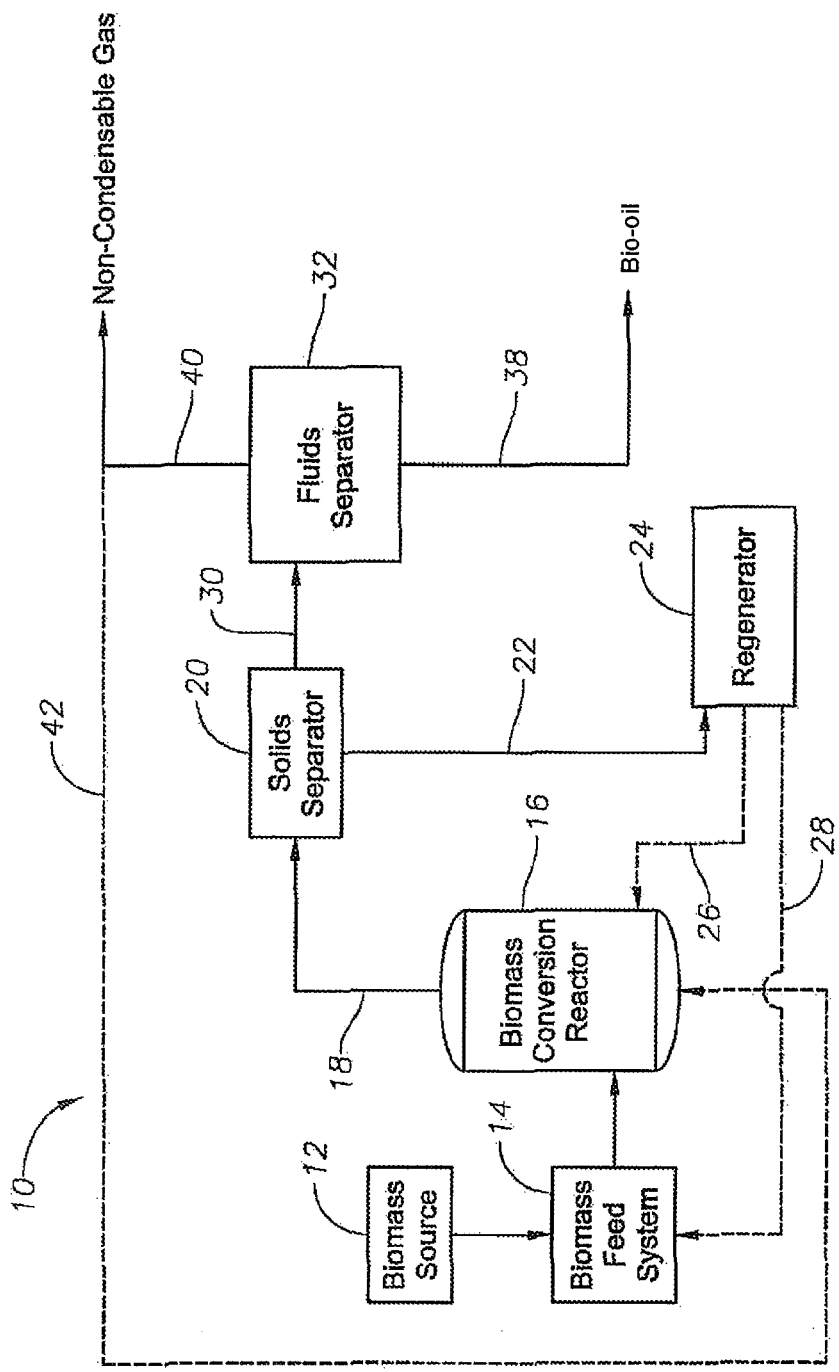
FIG. 1 is a schematic diagram of a biomass conversion system according to one embodiment of the present invention.

The following detailed description of various embodiments of the invention references FIG. 1, which illustrates a biomass conversion system suitable for use in producing bio-oil for use as a renewable heating oil, either alone or in combination with an oxygenated acyclic component, in accordance with the invention. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Pyrolysis as used herein refers to non-catalytic pyrolysis processes. Fast pyrolysis processes are pyrolysis processes for converting all or part of the biomass to bio-oil by heating the biomass in an oxygen-poor or oxygen-free atmosphere. The biomass is heated to pyrolysis temperature for a short time compared with conventional pyrolysis process, i.e. less than 10 seconds. Pyrolysis temperatures can be in the range of from about 200° C. to about 1000° C. Often the biomass will be heated in a reactor using an inert heat carrier, such as sand. As used above, the term "oxygen-poor" refers to an atmosphere containing less oxygen than ambient air. In general, the amount of oxygen should be such as to avoid combustion of the biomass material, or vaporized and gaseous products emanating from the biomass material, at the pyrolysis temperature. Preferably the atmosphere is essentially oxygen-free, that is, contains less than about 1 weight percent oxygen.

Biomass catalytic cracking (BCC) as used herein refers to a catalytic pyrolysis, wherein a catalyst is used to help facilitate cracking of the biomass components and derived compounds under fast pyrolysis type conditions. Accordingly, in a BCC process a dual role of the catalyst as heat carrier and catalyst itself is used in the reactor to facilitate the conversion of the biomass to bio-oil. The catalyst can be pre-mixed with the biomass before introduction into the reactor or be introduced into the reactor separately.

The present invention is directed to bio-oil compositions having chemical and physical properties that are particularly suited for use as a heating oil or heating fuel in furnaces, boilers or stoves. In particular, the invention aims to define a renewable heating fuel oil composition with increased stability, lower corrosiveness, and increased heating value as compared with pyrolysis oil. The bio-oil of the current invention is useful as a renewable heating fuel oil composition, or a component of a renewable heating fuel oil composition, characterized by having a heating value greater than about 10,000 btu/lb. More preferably, the heating value will be above about 11,000 btu/lb and, generally, from about 11,000 btu to about 18,000 btu/lb or about 14,000 btu/lb to about 18,000 btu/lb. Additionally, the bio-oil, useful as a component of the renewable heating fuel oil composition of the current invention, is characterized by being comprised of (i) an oxygenated component present in an amount such that the renewable heating fuel oil composition has an oxygen content of less than about 30 weight percent, and (ii) a non-oxygenated component having an aromatic content of at least about 25 weight percent. Preferably, the oxygenated component is present in the bio-oil in an amount such that the renewable heating fuel oil composition has an oxygen content from about 5 weight percent to about 30 weight percent, more preferably, from about 12 weight percent to about 20 weight percent, and even more preferably from about 7 weight percent to about 18 weight percent. Preferably, the aromatic content of the non-oxygenated component of the bio-oil will be at least about 40 weight percent, or from about 30 weight percent to about 70 weight percent, or from about 40 weight percent to about 60 weight percent. The oxygen content for the renewable heating fuel oil composition indicated here in is on a dry basis; that is without including the oxygen content of any water present in the renewable heating fuel oil composition.

The present invention can result in much more stable renewable heating fuel oil compositions than the prior art. In certain embodiments, the renewable heating fuel oil composition of the present invention will have a stability parameter less than 15 centipoise per hour (cp/h), or no greater than 10 cp/h, or no greater than 5 cp/h, or no greater than 1 cp/h, or no greater than 0.5 cp/h. The stability parameter characterizes the stability of a renewable heating fuel oil over time. As used herein, the "stability parameter" of a bio-oil or renewable heating fuel oil is defined as the slope of a best-fit straight line for a plot of bio-oil viscosity (centipoises) over time (hours), where the plotted viscosity values of samples of the aged bio-oil are measured at 40° C. and the aging process is carried out at 90° C. and the samples are taken at the onset of aging (time=0 hours), 8 hours from the onset of aging, 24 hours from the onset of aging, and 48 hours from the onset of aging. Only data points exhibiting a correlation coefficient greater than 0.9 ($R^2 > 0.9$) are used to determine the stability parameter. Generally, low stability bio-oil has a stability parameter greater than 75 cp/h, intermediate-stability bio-oil has a stability parameter in the range of 30 to 75 cp/h and high-stability bio-oil has a stability parameter of less than 30 cp/h. Additionally, bio-oil with a stability parameter of less than 1 cp/h can be classified as ultra-stable bio-oil so that high-stability bio-oil is that with a stability parameter below 30 cp/h but at least 1 cp/h.

Production of the inventive renewable heating fuel oil can be achieved by producing a bio-oil derived from a biomass that is converted in biomass catalytic cracking (BCC) process in accordance with the invention, particularly a BCC process using a transport fluid bed reactor. Turning now to FIG. 1, it depicts a biomass conversion system 10 that is suitable for producing the bio-oil which is useful as a renewable heating fuel oil composition, alone or in combination with an oxygenated acyclic component, in accordance with an embodiment of the current invention. It should be understood that the biomass conversion system shown in FIG. 1 is just one example of a system within which the present invention can be embodied. Embodiments of the present invention may find application in a wide variety of other systems where it is desirable to efficiently and effectively convert a biomass into a bio-oil useful as a renewable heating fuel oil composition, alone or in combination with an oxygenated acyclic component. The exemplary biomass conversion system illustrated in FIG. 1 will now be described in detail.

The biomass conversion system 10 of FIG. 1 includes a biomass source 12 for supplying a biomass feedstock to be converted to bio-oil. The biomass source 12 can be, for example, a hopper, storage bin, railcar, over-the-road trailer, or any other device that may hold or store biomass. The biomass supplied by the biomass source 12 can be in the form of solid particles. The biomass particles can be fibrous biomass materials comprising a cellulose-containing material (cellulosic material). Examples of suitable cellulose-containing materials include algae, paper waste, and/or cotton linters. In one embodiment, the biomass particles can comprise a lignocellulosic material. Examples of suitable lignocellulosic materials include forestry waste such as wood chips, saw dust, pulping waste, and tree branches; agricultural waste such as corn stover, wheat straw, and bagasse; and/or energy crops such as eucalyptus, switch grass, and coppice.

As depicted in FIG. 1, the solid biomass particles from the biomass source 12 can be supplied to a biomass feed system 14. The biomass feed system 14 can be any system capable of feeding solid particulate biomass to a biomass conversion reactor 16. While in the biomass feed system 14, the biomass material may undergo a number of pretreatments to facilitate the subsequent conversion reactions. Such pretreatments may include drying, roasting, torrefaction, demineralization, steam explosion, mechanical agitation, and/or any combination thereof.

In one embodiment, it may be desirable to combine the biomass with a catalyst in the biomass feed system 14 prior to introducing the biomass into the biomass conversion reactor 16. Alternatively, the catalyst may be introduced directly into the biomass conversion reactor 16. The catalyst may be fresh and/or regenerated catalyst. The catalyst can, for example, comprise a solid acid, such as a zeolite. Examples of suitable zeolites include ZSM-5, Mordenite, Beta, Ferrierite, and zeolite-Y. Additionally, the catalyst may comprise a super acid. Examples of suitable super acids include sulfonated, phosphated, or fluorinated forms of zirconia, titania, alumina, silica-alumina, and/or clays. In another embodiment, the catalyst may comprise a solid base. Examples of suitable solid bases include metal oxides, metal hydroxides, and/or metal carbonates. In particular, the oxides, hydroxides, and carbonates of alkali metals, alkaline earth metals, transition metals, and/or rare earth metals are suitable. Other suitable solid bases are layered double hydroxides, mixed metal oxides, hydrotalcite, clays, and/or combinations thereof. In yet another embodiment, the catalyst can also comprise an alumina, such as alpha-alumina.

It should be noted that solid biomass materials generally contain minerals. It is recognized that some of these minerals, such as potassium carbonate, can have catalytic activity in the conversion of the biomass material. Even though these minerals are typically present during the chemical conversion taking place in the biomass conversion reactor 16, they are not considered catalysts.

The biomass feed system 14 introduces the biomass feedstock into a biomass conversion reactor 16. In the biomass conversion reactor 16, biomass is subjected to a thermochemical conversion reaction that produces bio-oil. The reactor 16 can be any system or device capable of thermochemically converting biomass to bio-oil. The biomass conversion reactor 16 can be, for example, a fluidized bed reactor, a cyclone reactor, an ablative reactor, or a riser reactor.

In one embodiment, the biomass conversion reactor 16 can be a riser reactor and the conversion reaction can be catalytic enhanced fast pyrolysis or biomass catalytic cracking (BCC). As discussed above, the BCC conversion should occur in an oxygen-poor or, preferably, oxygen-free atmosphere. In one embodiment, BCC is carried out in the presence of an inert gas, such as nitrogen, carbon dioxide, and/or steam. Alternatively, the BCC conversion can be carried out in the presence of a reducing gas, such as hydrogen, carbon monoxide, non-condensable gases recycled from the biomass conversion process, and/or any combination thereof.

The BCC conversion process is characterized by short residence times and rapid heating of the biomass feedstock. The residence times of the conversion can be, for example, less than 10 seconds, less than 5 seconds, or less than 2 seconds. The BCC conversion may occur at temperatures between 200 and 1,000° C., between 250 and 800° C., or between 300 and 600° C.

In a particularly preferred embodiment, the catalyst is used as a heat carrier material and introduced into reactor 16 via line 26 at sufficient temperature to insure that the reaction mixture reaches a temperature between 200 and 1,000° C., between 250 and 800° C., or between 300 and 600° C. In this embodiment, rapid heating of the solid biomass material can generally be accomplished by providing the solid biomass material in the form of particles having a low mean particle diameter. Preferably, the mean particle diameter of the biomass is less than about 2000 µm, and more preferably less than about 1000 µm. The pretreatment of the biomass material can help achieve the desired particle size.

Referring again to FIG. 1, the conversion effluent 18 exiting the biomass conversion reactor 16 generally comprises gas, vapors, and solids. As used herein, the vapors produced during the conversion reaction may interchangeably be referred to as "bio-oil," which is the common name for the vapors when condensed into their liquid state. In the case of a BCC process, the solids in the conversion effluent 18 generally comprise particles of char, ash, and/or spent catalyst.

The bio-oil (contained in effluent 18) exiting the biomass conversion reactor 16 will be characterized by being comprised of mainly hydrocarbons and the hydrocarbons consist of (i) an oxygenated component present in an amount such that the renewable heating fuel oil composition has an oxygen content of about 30 weight percent or less, and (ii) a non-oxygenated component having an aromatic content of at least about 25 weight percent. In other embodiments, the oxygenated component is present in an amount such that the renewable heating fuel oil composition has an oxygen content (dry basis) of from about 5 weight percent to about 30 weight percent or, from about 12 weight percent to about 20 weight percent, or from about 7 to about 18 weight percent. In other embodiments, the aromatic content of the non-oxygenated component will be at least about 40 weight percent, or from about 30 weight percent to about 70 weight percent, or from about 40 weight percent to about 60 weight percent. It is a distinct advantage of the current invention that the bio-oil does not need to be treated with an oxygen removing process, such as hydrotreatment, to achieve the above composition. The cost associated with hydrotreatment process and the necessity to hydrotreat bio-oil before it is suitable for use as renewable heating fuel oil renders pyrolysis bio-oils uneconomical for use as heating oil or heating fuel.

As depicted in FIG. 1, the conversion effluent 18 from the biomass conversion reactor 16 can be introduced into a solids separator 20. The solids separator 20 can be any conventional device capable of separating solids from gas and vapors such as, for example, a cyclone separator or a gas filter. The solids separator 20 removes a substantial portion of the solids (e.g., spent catalysts, char, and/or heat carrier solids) from the conversion effluent 18. The solid particles 22 recovered in the solids separator 20 can be introduced into a regenerator 24 for regeneration, typically by combustion. After regeneration, at least a portion of the hot regenerated solids can be introduced directly into the biomass conversion reactor 16 via line 26. Alternatively or additionally, the hot regenerated solids can be directed via line 28 to the biomass feed system 14 for combination with the biomass feedstock prior to introduction into the biomass conversion reactor 16.

The substantially solids-free fluid stream 30 exiting the solids separator 20 can then be introduced into a fluids separator 32. As mentioned above, it is preferred and an advantage of the current invention that the bio-oil 30 entering the fluids separator 32 has not previously been subjected to a deoxygenation process such as, for example, hydrotreating. Within fluids separator 32, non-condensable gas is separated from the bio-oil. The fluids separator 32 can be any system capable of separating the bio-oil contained in stream 30 from the non-condensable gas. Suitable systems to be used as the fluids separator 32 include, for example, systems for affecting separation by fractional distillation, heated distillation, extraction, membrane separation, partial condensation, and/or non-heated distillation. As shown in FIG. 1, non-condensable gases 40 removed from the fluids separator 32 may be, optionally, recycled via lines 40 and 42 to the biomass conversion reactor 16 for use as a lift gas.

As discussed above, the resulting bio-oil 38 useful as a renewable heating fuel oil composition, alone or in combination with an oxygenated acyclic component, is characterized by a heating value of at least about 10,000 btu/lb, or at least about 11,000 btu/lb, or from about 11,000 to about 18,000 btu/lb, or from about 14,000 to about 18,000 btu/lb without further treatment to remove oxygen, such as in an oxygen-removing hydrotreatment process. Such bio-oil can have an oxygen content that is less than about 20, 15, 12, 10, or 8 percent by weight of the bio-oil. The oxygen content can also be greater than about 5, 8, or 10 percent by weight of the bio-oil.

In accordance with another embodiment, the renewable heating fuel oil composition comprises:
a) a first component comprising the bio-oil;
b) a second component comprising an oxygenated acyclic component comprising open chain molecules having 12 or more carbon atoms per molecule; and
wherein the renewable heating fuel oil composition has a heating value of at least about 14,000, or at least about 15,000, or at least about 16,000 Btu/lb.

In accordance with another embodiment, the bio-oil described above comprises: i) an oxygenated component having an oxygen content of at least about 5 wt %, or from about 10 to about 30 wt %, or from about 12 to about 20 wt %, and ii) a non-oxygenated component having an aromatic content of at least about 25 wt %, or at least about 40 wt %, or from about 30 to about 70 wt %, or from about 40 to about 60 wt %.

In accordance with other embodiments, the oxygen content of the renewable heating fuel oil composition comprising the first and second components is from about 5 to about 30 wt %, or from about 12 to about 20 wt %, or from about 7 to about 18 wt %. The oxygenated component is present in the bio-oil in the range of from about 10 to about 90 wt %, or from about 20 to about 80 wt %. The non-oxygenated component is present in the bio-oil in the range of from about 15 to about 70 wt %, or from about 20 to about 60 wt %. The non-oxygenated aromatic content of the renewable heating fuel oil composition is from about 3 to about 60 wt %, or from about 25 to about 60 wt %.

In accordance with other embodiments, the first component is present in the renewable heating fuel oil composition in the range of from about 50 to about 99 wt %, or from about 60 to about 95 wt %; and the second component is present in the renewable heating fuel oil composition in the range of from about 0.5 to about 50, or from about 1 to about 50 wt %, or from about 2 to about 45 wt %, or from about 5 to about 40 wt %.

In accordance with other embodiments, the bio-oil is present in the renewable heating fuel oil composition in the range of from about 60 to about 95 wt %, or from about 70 to about 90 wt %; and the oxygenated acyclic component is present in the renewable heating fuel oil composition in the range of from about 5 to about 40 wt %, or from about 10 to about 30 wt %. The second component is selected from the group consisting of: a fatty acid methyl ester (FAME), biodiesel, biomass-derived diesel, an at least partially upgraded bio-oil or fraction thereof derived from the at least partial deoxygenation of a portion of the bio-oil, and combinations thereof. The at least partially upgraded bio-oil or fraction thereof comprises less than about 20, or less than about 15, or less than about 10, or less than about 8, or less than about 6, or less than about 4 wt % oxygen, and can be prepared in accordance with the methods disclosed in co-pending U.S. application Ser. No. 13/964,873, filed Aug. 12, 2013, which has been incorporated by reference in its entirety herein.

In accordance with other embodiments, the second component has a heating value of at least about 14,000, or at least about 16000 Btu/lb. The open chain molecules having 12 or more carbon atoms per molecule are present in the second component in an amount of from about 70 to about 99 wt %, or from about 80 to about 99, or from about 85 to about 99. Also, the open chain molecules having 12 or more carbon atoms per molecule are present in the renewable heating fuel oil composition in an amount of from about 3 to about 50 wt %, or from about 7 to about 40 wt %, or from about 8 to about 35 wt %.

In accordance with other embodiments, the renewable heating fuel oil composition is used as a fuel for a furnace, boiler, combustor, thermal oxidizer, turbine, or stove. The thermochemical conversion of the biomass to produce the bio-oil does not include an oxygen-removing hydrotreatment step. The renewable heating fuel oil composition has a stability parameter no greater than about 15, or no greater than about 10, or no greater than about 5, or no greater than about 1, or no greater than about 0.5 cp/h.

In accordance with other embodiments, at least about 50, or at least about 60, or at least about 70 wt % of the renewable heating fuel oil composition has a boiling point from about 180° C. to about 380° C. As described above, the bio-oil is produced by a process comprising: a) converting at least a portion of the biomass in an oxygen-poor environment in the presence of a catalyst material at a temperature in the range of from about 200° C. to about 1000° C. to produce a reaction product stream containing the bio-oil; and b) separating the bio-oil from the reaction product stream; wherein steps a) and b) do not include an oxygen-removing hydrotreatment step.

EXAMPLES

Example 1

Three bio-oil samples were produced from the conversion of yellow pine particles. Sample A was produced by biomass catalytic cracking using a clay-type catalyst in a riser reactor operated at a reactor outlet temperature of about 550° C. Samples B and C were produced by biomass catalytic cracking using a zeolite-type catalyst in a riser reactor operated at a reactor outlet temperature of about 600° C. The oxygen content and heating value of the bio-oil were determined by ASTM D5291 and ASTM D240 test methods, respectively. The results are shown in Table 1.

TABLE 1

|  | Sample A | Sample B | Sample C |
|---|---|---|---|
| Oxygen Content (% wt.) | 24 | 17 | 10 |
| Heating Value (btu/lb) | 11,261 | 13,727 | 15,156 |

For comparison, the heating value of typical pyrolysis bio-oils does not exceed 10,000 btu/lb as can be seen from a) Mahinpey, N.; Murugan, P.; Mani, T. and Raina, R. *Analysis of bio-oil, biogas, and biochar from pressurized pyrolysis of wheat straw using a tubular reactor*. Energy & Fuels 2009. 23 (5), 2736-2742; and b) Czernik, S. and Bridgwater, A. V. *Overview of applications of biomass fast pyrolysis oil*. Energy and Fuels 2004. 18 (2), 590-598.

Example 2

Stability was assessed for four samples of bio-oil based on changes in viscosity using an accelerated thermal stability test based on the observations of Czernik et al. as reported in Czernik, S.; Johnson, D. K. and Black, S. *Stability of wood fast pryrolysis oil*. Biomass and Bioenergy 1994. 7 (1-6), 187-192. Czernik et al. illustrates that viscosity changes for bio-oil stored 12 weeks at 37° C. corresponds to 6 hours at 90° C. and, hence, that viscosity changes for bio-oil stored 1 year at 37° C. corresponds to 24 hours at 90° C. The accelerated thermal stability test used for the inventive bio-oil samples in these examples comprised heating the samples to 90° C. and holding the samples at that temperature for 48 hours. Test amounts were taken from the samples at 0, 8, 24 and 48 hours and viscosity measurements were taken with the test amount temperature being at 40° C. Viscosity was measured using a modified version of ASTM D2983 using a higher temperature than standard due to the high viscosity of bio-oil at low temperature. Viscosity was measured at 40° C. using a Brookfield viscometer. As indicated above, the increase in viscosity under these conditions correlates with room temperature storage such that 24 hours of testing time at 90° C. is equal to the change in a year at near room temperature storage. The accelerated aging test correlates well with the chemical changes in the liquid, associated to polymerization or condensation reactions. (See also, Oasmaa, A. and Kuoppala, E. *Fast pyrolysis of forestry residue*. 3. *Storage stability of liquid fuel*. Energy and Fuels 2003, 17 (4), 1075-85.)

Figure 2:
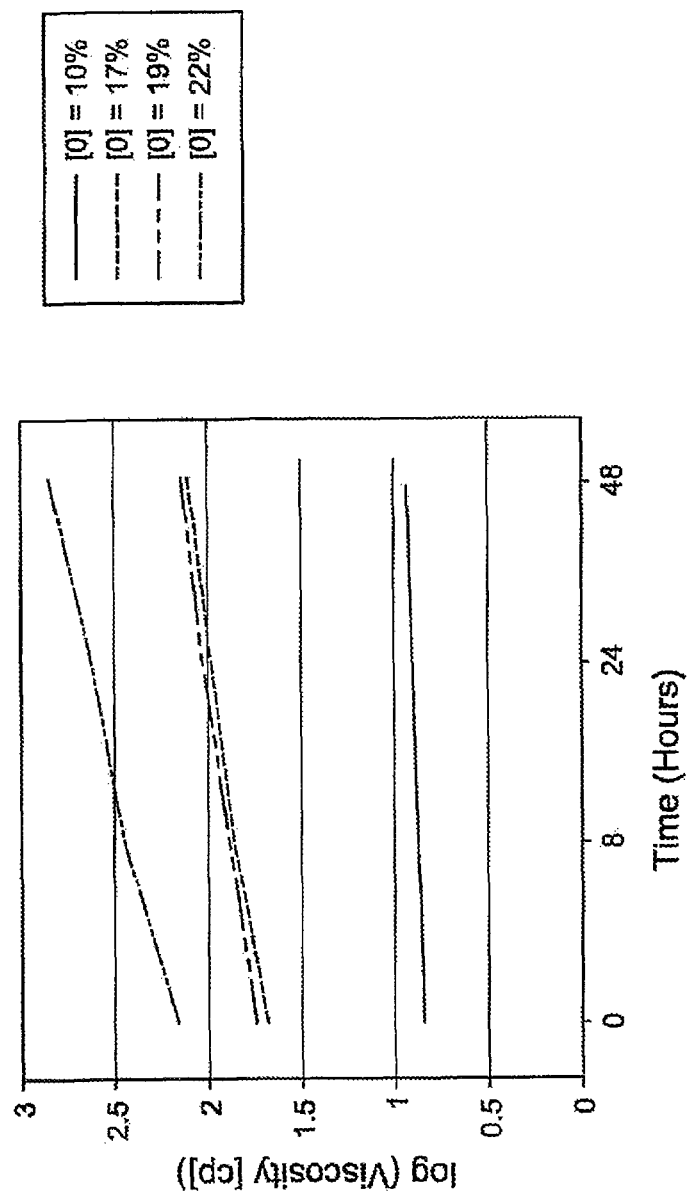
FIG. 2 is graph illustrating the stability of bio-oil samples over time.

Four bio-oil samples, representative of the present invention, were produced from the conversion of yellow pine particles by biomass catalytic cracking using a zeolite-type catalyst in a riser reactor operated at a reactor outlet temperature of about 500 to 600° C. The results of the stability test are illustrated in FIG. 2. For comparison, as reported in Czernik et al., typical pyrolysis oils submitted to this accelerated thermal stability test have all shown a nearly 100% increase in viscosity after eight hours (see FIG. 3, which is a graphical representation of viscosity data for stored pyrolysis oil at 90° C. taken from Table 2 of Czernik et al.)

Example 3

Three additional bio-oil samples produced from southern yellow pine by biomass catalytic cracking using a zeolite-type catalyst in a riser reactor operated at a reactor outlet temperature of about 500 to 650° C. The three bio-oil samples were subjected to the accelerated thermal stability test in order to establish the effect of increased stability in the heat value of bio-oils. As shown in Table 2, ultra-stable bio-oils (bio-oils with a stability parameter of less than 1 cp/h) all exhibited low oxygen content and heating values greater than 10,000 btu/lb. Accordingly, the ultra-stable bio-oils all had superior heating value.

TABLE 2

| Sample | [O] (wt %) | Stability Parameter (cps/h) | Heating Value (btu/lb) |
|---|---|---|---|
| Sample 8 | 9 | 0.13 | 15200 |
| Sample 9 | 10 | 0.26 | 14939 |
| Sample 10 | 12 | 0.33 | 14500 |

Example 4

A corrosion test was performed according to general test procedures ASTM G31 on stainless steel, at two different temperatures for the liquid and vapor phases of heating bio-oil samples produced from southern yellow pine by biomass catalytic cracking using a zeolite-type catalyst in a riser reactor operated at a reactor outlet temperature of about 500 to 650° C. The samples contained 10 and 17% wt. oxygen, produced as in Example 1. No corrosion was detectible.

Example 5

A low oxygen bio-oil (130-16) was produced from the conversion of southern yellow pine wood particles by pyrolysis in the presence of a catalyst in a riser reactor operated at a reactor outlet temperature of about 650° C. The resulting bio-oil had an oxygen content of 16.64 weight percent. The composition (in wt %) of the bio-oil is shown below in Table 3.

TABLE 3

| Volatiles + Semivolatiles | BO-16 |
|---|---|
| Aldehydes | 3.5729 |
| Furans | 2.0658 |
| Ketones | 5.6386 |
| Carboxylic Acids | 1.4571 |
| Phenols | 12.994 |
| Indenols | 1.5968 |
| Diols | 4.7505 |
| Naphthols | 0.8184 |
| Hydrocarbons: | |
| BTEX | 3.1836 |
| Other PAHs | 0.529 |
| Other Benzenes/Toluenes | 1.1576 |
| Indenes | 1.3873 |
| Indanes | 0.1297 |
| Naphthalenes | 0.8483 |
| Total Volatiles + Semivolatiles | 40.18 |
| Non-volatiles (by difference) | 59.82 |

Three separate portions of the bio-oil B0-16 were combined with FAME forming a BF5 blend containing 5 wt % FAME, a BF10 blend containing 10 wt % FAME, and a BF15 blend containing 15 wt % FAME. The thermal stabilities of the bio-oil, BF5, BF10, and BF15 were assessed based on changes in viscosity using the accelerated thermal stability test. The accelerated thermal stability test used for the bio-oil, BF5, BF10, and BF15 samples in this example comprised heating the samples to 90° C. and holding the samples at that temperature for up to 48 hours. Viscosity was measured at 40° C. using a Brookfield viscometer. The accelerated aging test correlates well with the chemical changes in the liquid, associated with polymerization or condensation reactions. (See also, Oasmaa, A. and Kuoppala, E. *Fast pyrolysis of forestry residue. 3. Storage stability of liquid fuel*. Energy and Fuels 2003, 17 (4), 1075-85.) The results of the thermal stability test (expressed as a "Stability Parameter"—SP—which represents the change in viscosity in centipoises (cp) per unit time in hours (h), having the units cp/h and was evaluated as the slope of a plot of viscosity vs. time) are shown in Table 4 below. As can be seen from the data, the SP for the bio-oil/FAME blends BF5, BF10 and BF15 was significantly reduced as compared to the virgin bio-oil.

TABLE 4

| Sample | [FAME], wt % | [O], wt % | SP, cp/h |
|---|---|---|---|
| Bio-oil | 0 | 16.64 | 0.2372 |
| BF5 | 5 | 15.19 | 0.0997 |
| BF10 | 10 | 15.60 | 0.0685 |
| BF15 | 15 | 15.27 | 0.0359 |

Example 6

Two different 0-containing bio-oil samples were tested in this example. B0-16 and B0-21 are bio-oil samples with 16 wt % and 21 wt % 0-content, respectively. Separate portions of each bio-oil were combined with FAME forming blends containing different proportions of each of these components. Light scattering was used to assess the phase segregation stability of these blends using a Turbiscan MA2000 instrument. Turbiscan is an instrument for measuring light scattering in fluids. This system couples light scattering with a scan of the sample length to give a picture of its homogeneity or changes in homogeneity. The overlay of several scans over time enables stability analysis of the sample from 20 to 50 times faster than visual detection. The detected stability during a 16 h scanning experiment is a measure of the fouling propensity of the blend.

TABLE 5

| | | Turbiscan assessed stability | |
|---|---|---|---|
| Bio-oil | FAME, wt % | Back-scattering Intensity Slope Change (%/hr) | Remarks |
| BO-16 | 0 | 0.0 | Stable |
| | 5 | 0.0 | Stable |
| | 10 | 0.0 | Stable |
| | 15 | 0.0 | Stable |
| | 25 | 0.0 | Stable |
| | 30 | 0.0 | Stable |
| | 40 | −0.02 | Unstable |
| | 90 | −1.2 | Unstable |
| BO-21 | 5 | 0.0 | Stable |
| | 10 | 0.0 | Stable |
| | 15 | 0.0 | Stable |
| | 20 | 0.0 | Stable |
| | 25 | 0.0 | Stable |
| | 30 | −0.1 | Unstable |
| | 40 | −0.3 | Unstable |
| | 50 | −0.9 | Unstable |
| | 75 | −3.0 | Unstable |
| | 90 | −9.0 | Unstable |

As can be seen in Table 5 above, the lower the 0-content of the bio-oil, the higher the miscible FAME content to render stable solutions.

While the technology has been particularly shown and described with reference to specific embodiments, it should be understood by those skilled in the art that various changes in form and detail may be made without departing from the spirit and scope of the technology as defined by the appended claims.

As used herein, the terms "a," "an," "the," and "said" means one or more.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up of the subject.

As used herein, the terms "containing," "contains," and "contain" have the same open-ended meaning as "comprising," "comprises," and "comprise," provided below.

As used herein, the terms "having," "has," and "have" have the same open-ended meaning as "comprising," "comprises," and "comprise," provided above.

As used herein, the terms "including," "includes," and "include" have the same open-ended meaning as "comprising," "comprises," and "comprise," provided above.

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A renewable heating fuel oil composition comprising:
   a) a first component comprising a bio-oil derived from the thermochemical conversion of biomass, wherein the bio-oil comprises: i) an oxygenated component having an oxygen content of at least about 5 wt %, and ii) a non-oxygenated component having an aromatic content of at least about 25 wt %;
   b) a second component comprising an oxygenated acyclic component comprising open chain molecules having 12 or more carbon atoms per molecule; and
   wherein the renewable heating fuel oil composition has a heating value of at least about 14,000 Btu/lb.

2. The renewable heating fuel oil composition of claim 1 wherein the oxygen content of the oxygenated component of the bio-oil is from about 10 to about 30 wt %.

3. The renewable heating fuel oil composition of claim 1 wherein the oxygen content of the renewable heating fuel oil composition is from about 5 to about 30 wt %.

4. The renewable heating fuel oil composition of claim 1 wherein the aromatic content of the non-oxygenated component of the bio-oil is from about 30 to about 70 wt %.

5. The renewable heating fuel oil composition of claim 1 wherein the oxygenated component is present in the bio-oil in the range of from about 10 to about 90 wt %.

6. The renewable heating fuel oil composition of claim 1 wherein the non-oxygenated component is present in the bio-oil in the range of from about 20 to about 60 wt %.

7. The renewable heating fuel oil composition of claim 1 wherein the non-oxygenated aromatic content of the renewable heating fuel oil composition is from about 3 to about 60 wt %.

8. The renewable heating fuel oil composition of claim 1 wherein the non-oxygenated aromatic content of the renewable heating fuel oil composition is from about 25 to about 60 wt %.

9. The renewable heating fuel oil composition of claim 1 wherein the first component is present in the renewable heating fuel oil composition in the range of from about 50 to about 99 wt %; and wherein the second component is present in the renewable heating fuel oil composition in the range of from about 0.5 to about 50 wt %.

10. The renewable heating fuel oil composition of claim 1 wherein the bio-oil is present in the renewable heating fuel oil composition in the range of from about 60 to about 95 wt %; and wherein the oxygenated acyclic component is present in the renewable heating fuel oil composition in the range of from about 5 to about 40 wt %.

11. The renewable heating fuel oil composition of claim 1 wherein the second component is selected from the group consisting of: a fatty acid methyl ester (FAME), biodiesel, biomass-derived diesel, an at least partially upgraded bio-oil derived from the at least partial deoxygenation of a portion of the bio-oil, and combinations thereof.

12. The renewable heating fuel oil composition of claim 11 wherein the at least partially upgraded bio-oil comprises less than about 20 wt % oxygen.

13. The renewable heating fuel oil composition of claim 1 wherein the second component has a heating value of at least about 14,000 Btu/lb.

14. The renewable heating fuel oil composition of claim 1 wherein the open chain molecules having 12 or more carbon atoms per molecule are present in the second component in an amount of from about 70 to about 99 wt %.

15. The renewable heating fuel oil composition of claim 1 wherein the open chain molecules having 12 or more carbon atoms per molecule are present in the renewable heating fuel oil composition in an amount of from about 3 to about 50 wt %.

16. The renewable heating fuel oil composition of claim 1 wherein the renewable heating fuel oil composition is used as a fuel for a furnace, boiler, combustor, thermal oxidizer, turbine, or stove.

17. The renewable heating fuel oil composition of claim 1 wherein the thermochemical conversion of the biomass to produce the bio-oil does not include an oxygen-removing hydrotreatment step.

18. The renewable heating fuel oil composition of claim 1 having a stability parameter of less than about 15 cp/h.

19. The renewable heating fuel oil composition of claim 18 having a stability parameter of less than about 10 cp/h.

20. The renewable heating fuel oil composition of claim 1 having a heating value of at least about 15,000 Btu/lb.

21. The renewable heating fuel oil composition of claim 1 having a heating value of at least about 16,000 Btu/lb.

22. The renewable heating fuel oil composition of claim 1 wherein at least about 50 wt % of the renewable heating fuel oil composition has a boiling point from about 180° C. to about 380° C.

23. The renewable heating fuel oil composition of claim 1 wherein at least about 60 wt % of the renewable heating fuel oil composition has a boiling point from about 180° C. to about 380° C.

24. The renewable heating fuel oil composition of claim 1 wherein the bio-oil is produced by a process comprising:
   a) converting at least a portion of the biomass in an oxygen-poor environment in the presence of a catalyst material at a temperature in the range of from about 200° C. to about 1000° C. to produce a reaction product stream containing the bio-oil; and
   b) separating the bio-oil from the reaction product stream; wherein steps a) and b) do not include an oxygen-removing hydrotreatment step.

* * * * *